Aug. 7, 1962 V. W. LARKE ETAL 3,048,236
ANTI-FRICTION BEARING GREASE DISPENSER
Filed Jan. 25, 1960 3 Sheets-Sheet 2
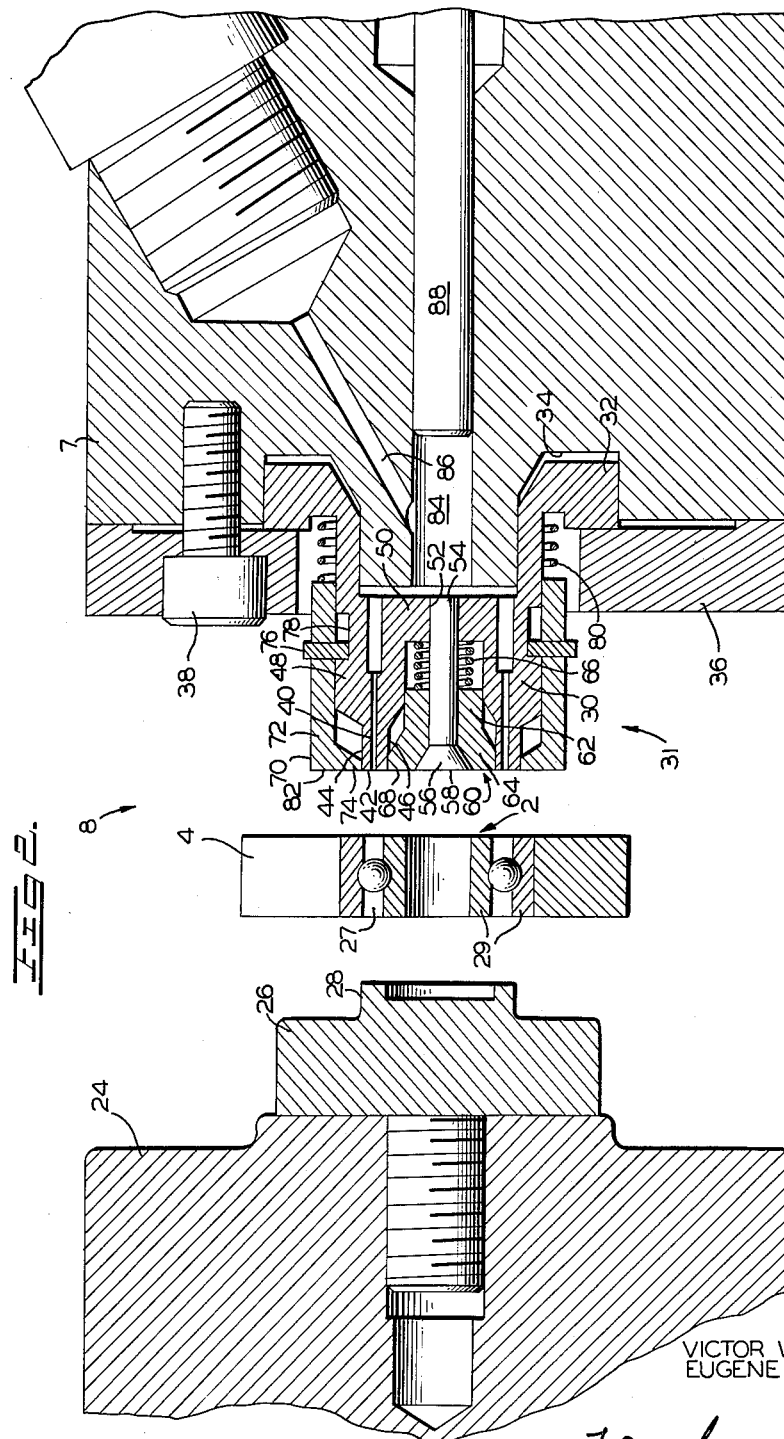
INVENTORS
VICTOR W. LARKE
EUGENE V. SPANSKI
BY *F. J. Soucek*
ATTORNEY

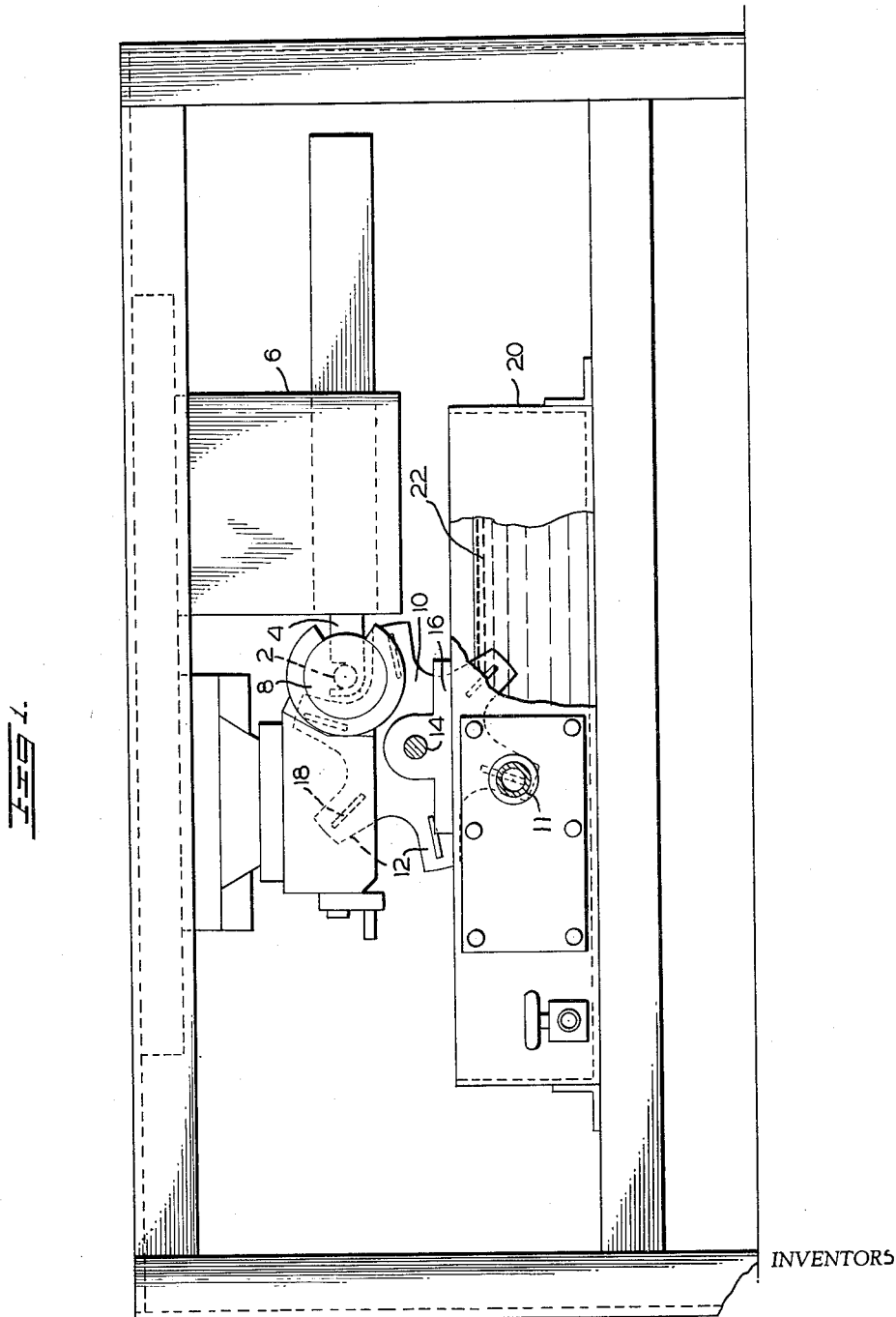

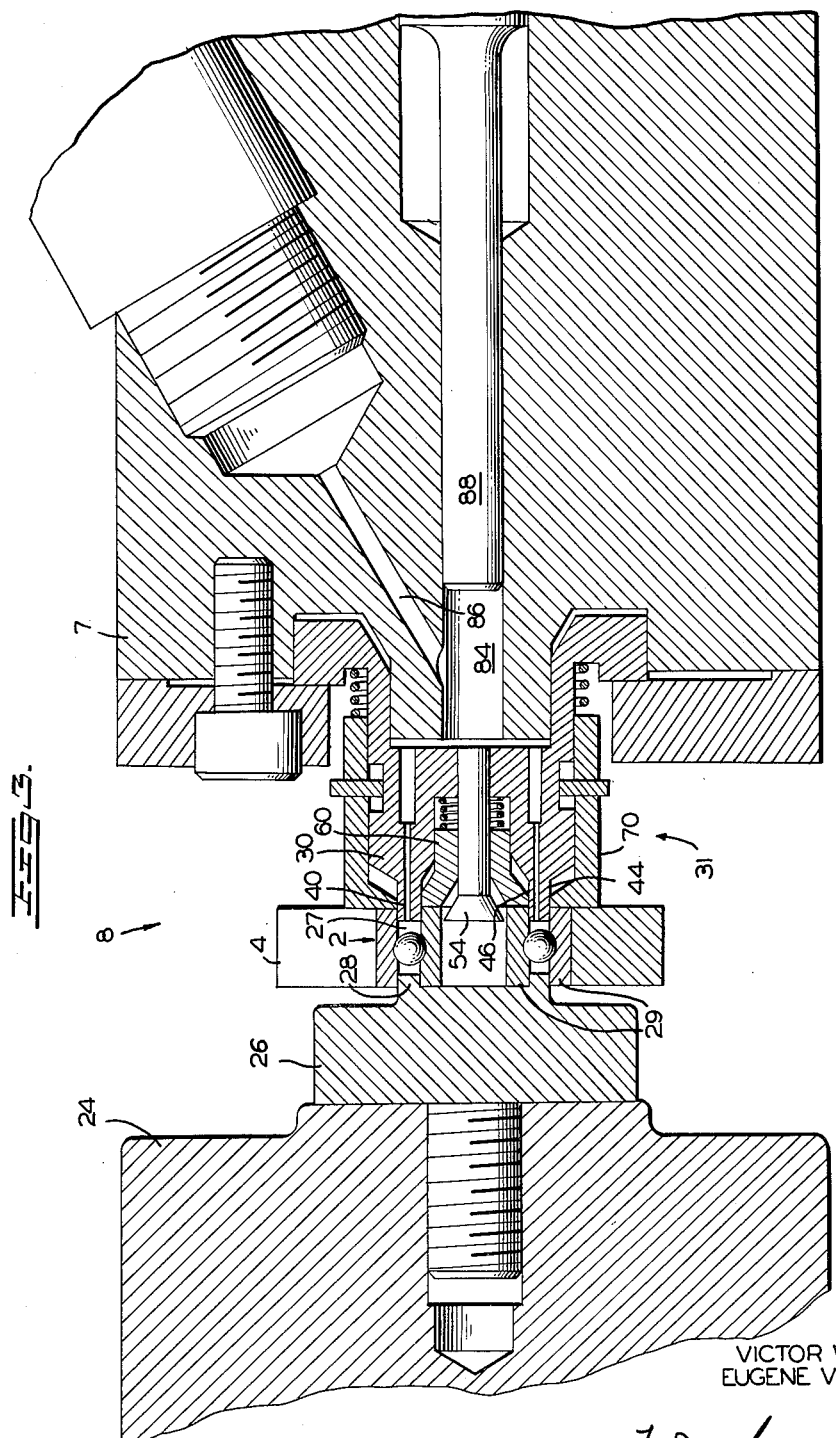

United States Patent Office 3,048,236
Patented Aug. 7, 1962

3,048,236
ANTI-FRICTION BEARING GREASE DISPENSER
Victor W. Larke, Kokomo, Ind., and Eugene V. Spanski, Warren, Mich., assignors to General Motors Corporation, Detroit, Mich., a corporation of Delaware
Filed Jan. 25, 1960, Ser. No. 4,358
9 Claims. (Cl. 184—1)

This invention relates generally to grease dispensers and more particularly to a grease dispenser having a self-cleaning dispensing head. In conventional grease dispensers the accumulation of surplus grease from prior dispensing operations has caused difficulty in maintaining accuracy in the amount of grease retained in a particular bearing assembly. Further, such excess grease may become deposited in the grooves provided for bearing seals.

The objects of this invention are to improve the accuracy of grease dispensers and eliminate the undesirable deposition of grease in bearing seal grooves by providing means for automatically cleaning the dispenser after each operation as well as to improve the distribution of grease in the bearing assembly and to alleviate bleeding of grease from the nozzle. The above and other objects and advantages of this invention will be made more apparent from the following description when read in connection with the accompanying drawings wherein like reference numerals refer to like parts and wherein:

FIGURE 1 is a front elevational view of a grease dispenser in accordance with the present invention;

FIGURE 2 is a cross sectional view of the dispensing head in retracted position in accordance with the present invention; and FIGURE 3 is a cross-sectional view of the dispensing head of FIG. 2 in dispensing position.

Referring to FIGURE 1, a bearing assembly 2 is supported in a bearing holder 4. The holder 4 is held in support 6 so that the holder 4 will shuttle back and forth to alternately locate a bearing assembly in axial alignment with the dispensing head 8 or in an unloading position, not shown. The bearing holder is thus moved by a rack and pinion arrangement, not shown, or by other conventional linear actuator means.

A rotary cleaning wheel 10 having a plurality of arms 12 is fixedly mounted on a shaft 14, which is rotatably journalled in the shaft support 16. The cleaning wheel is positioned so that the arms 12 move in a path closely adjacent the dispensing head 8. Synthetic rubber or plastic blades 18 are secured on each of the arms 12 so that they contact the face of the dispensing head 8 upon rotation of the wheel 10. A tank 20 containing a liquid solvent 22 is placed under the dispensing head 8 such that the lower portion of the cleaning wheel 10 is constantly immersed therein. A low pressure air jet 11 is connected to the tank to cause turbulence of the solvent to aid in removal of grease from the immersed blades 18.

In FIG. 2 a rotatable bearing positioner head 24 has a bearing position fixture 26 removably secured thereto. The fixture 26 has an axially extending annular portion 28 adapted to cooperate with the annular recess 27 between the bearing races 29 of bearing assembly 2. The head 24 is rotatable to provide means for rotating the assembly 2.

The grease dispensing head 8 has a body portion 7 which supports a nozzle assembly 31 including a perforated nozzle 30. The nozzle 30 has a radially extending annular base 32 which is received in an annular recess 34 in the body portion 7. A plate 36 is removably attached to the body 7 by bolts 38 and engages the base 32 to rigidly hold it within the recess 34.

As illustrated in the drawings the left extremity of the nozzle 30 terminates in a tip 40 having a flat end surface 42, a cylindrical outer surface 44 and a cylindrical inner surface 46. The tip 40 is connected to the base 32 by an enlarged body portion 48, and the central part of the nozzle is partly closed by an integral ring 50 having a bore 52 therein. A post 54 is secured in the bore 52 and terminates in a conical head 56 having a flat end surface 58 in the plane of the tip surface 42.

An inner wiper element 60 comprising a cylindrical right portion 62 and a conical left portion 64 is adapted to slide axially in the space between the tip 40 and the post 54. A spring 66 between the wiper 60 and the ring 50 urges the wiper to the left. When in the extreme left position the flat end surface 68 of the wiper 60 is in the plane of and fills the gap between the surfaces 42 and 58 of the tip 40 and the head 56, respectively, and at all times the conical outer portion 64 of the wiper is in snug sliding contact with the inner surface 46 of the tip 40.

An outer wiper element 70 comprises an annular portion 72 with a radially inwardly extending flange 74 on the left end. A plurality of pins 76 projecting radially inwardly from the annular portion 72 engage a groove 78 in the nozzle body 48 for limiting the movement of the outer wiper 70. A spring 80 compressed between the outer wiper 70 and the base 32 forces the wiper 70 to the left. In the extreme left position the flat end surface 82 of the outer wiper is in the same plane as the surfaces 42, 58, and 68 so that the four main elements 40, 54, 60, and 70 of the nozzle 30 present a flat continuous surface. As in the case of the inner wiper 60 the head 74 of the outer wiper 70 is always in snug sliding contact with the outer surface 44 of the tip 40.

The dispensing head 8 contains a discharge chamber 84 in communication with the nozzle 30. A supply line 86 admits grease to the discharge chamber and plunger 88 in said chamber forces the grease through the nozzle.

In operation, as shown in FIG. 3, the bearing holder 4 places a bearing assembly 2 in axial alignment with the bearing position fixture 26 and the nozzle 30. The heads 8 and 24 simultaneously move toward each other until the annular portion 28 and tip 40 engage the recess 27 of the bearing assembly 2 so that the positioner head 24 helps to firmly hold the bearing assembly 2 as well as to position it. In appropriate cases depending upon the size of bearing being lubricated the positioner head 24 may also serve to rotate the bearing assembly to aid in uniform distribution of the grease.

As the tip 40 of the nozzle 30 enters the recess between the races the post 54 enters central cavity of the bearing assembly 2. At the same time the wiper elements 60 and 70 are pushed back by the bearing races 29 to a retracted position. A predetermined amount of grease supplied from a conventional lubricant metering apparatus (not shown) is fed through line 86 to the discharge chamber 84. The plunger 88 moves to the left to force the metered grease through the nozzle 30 into the bearing recess 27. After the plunger 88 has reached the end of its stroke it will partially retract thereby creating a vacuum to tend to draw some grease back into the nozzle tip 40 thereby preventing any bleeding from said tip. Further, in the partially retracted position the plunger will block the opening of the supply line 86 to prevent the grease from bleeding into the discharge chamber 84.

When the heads 8 and 24 are moved apart to retract the nozzle tip 40 from the bearing the spring-loaded wiper elements 60 and 70 will move to the left bringing grease on the sides 44, 46 of the nozzle tip 40 to the surface thereof. The bearing assembly 2 is removed from the lubricating position by the holder 4 at which time the cleaning wheel 10 is manually or automatically indexed past the grease dispensing head 8. A blade 18 will brush past the surface of the nozzle assembly 31 wiping all the grease therefrom, leaving a clean apparatus ready for another dispensing operation. The wiper blades 18 will upon rotation be immersed in the solvent 22 so that the grease will be removed. While there are a plurality of wipers 18 on the wheel 10 it is necessary for only one to wipe the nozzle assembly 31 in each dispensing cycle. Obviously the bearing position fixture and the nozzle assembly may be readily removed so that appropriate parts may be used for the lubrication of different size bearing assemblies.

Hence, it is readily seen that the present invention will serve to provide a self-cleaning grease dispenser and will have the advantages of providing a more accurate amount of lubricant for each injection and will not be hampered by uncontrolled accumulations of surplus grease which tends to make the amount of the deposits erratic.

What is claimed is:

1. A grease dispenser comprising a nozzle having a flat end surface and cylindrical inner and outer surfaces, wiper means to bring grease on said inner and outer surfaces to said end surface and means to remove said grease from said end surface.

2. A grease dispenser as described in claim 1 having a solvent means for removing grease from the said removal means.

3. A grease dispenser having an annular perforated nozzle with a flat end face for injecting grease into a bearing, a mating annular element disposed inside said nozzle, a second mating element disposed outside said nozzle, said elements being spring-biased to wipe excess grease toward the face of said nozzle when the nozzle is retracted from the bearing, a rotary cleaning wheel having a plurality of wiper blades, said blades selectively engageable with the face of said nozzle to wipe excess grease therefrom, a solvent bath adjacent said cleaning wheel, said blades being immersible in said bath for removing the grease therefrom.

4. A grease dispenser comprising an annular nozzle having inner and outer cylindrical surfaces and a planar end face, a post concentrically secured within said nozzle and slidingly supporting an inner wiper element, said post having a head terminating in the plane of the nozzle face, said inner wiper element slidably contacting the inside surface of said nozzle and normally spring-biased against said head, an outer wiper element slidably contacting the outer surface of said nozzle and spring-biased toward said face, a flat outer end surface on each of said wiper elements, said end surfaces lying in the plane of the nozzle face when said wiper elements are in the normal spring biased position, and said elements serving to remove grease from said cylindrical nozzle surfaces.

5. A dispensing nozzle and cleaning apparatus therefor, said cleaning apparatus comprising, a solvent bath adjacent said nozzle, a rotary cleaning member partially immersed in said bath, and wiper means on said cleaning member in wiping contact with said nozzle upon rotation of the cleaning member whereby surplus material is removed from said nozzle and deposited in said bath.

6. A grease dispensing nozzle and cleaning apparatus therefor, said cleaning apparatus comprising, a solvent bath beneath said nozzle, a rotary cleaning wheel partially immersed in said bath, wiper arms projecting generally radially from said cleaning wheel and having a wiper blade on each arm, whereby upon rotation of said cleaning wheel at least one of said blades makes wiping contact with said nozzle to cleanse surplus grease therefrom.

7. A grease dispensing nozzle having a flat end face and cleaning apparatus therefor, said cleaning apparatus comprising a solvent bath beneath said nozzle, a rotary cleaning wheel partially immersed in said bath, and wiper arms projecting generally radially from said cleaning wheel, each of said wiper arms having a wiper blade thereon adapted to contact said face of said nozzle, whereby upon rotation of said cleaning wheel at least one of said blades makes wiping contact with said nozzle end face to cleanse surplus grease therefrom.

8. In combination, a bearing assembly having inner and outer races and an annular recess therebetween, a grease dispenser for injecting grease into said bearing assembly, said dispenser comprising an annular perforated nozzle within said annular recess on one side of said bearing, rotatable supporting means for said bearing assembly, said supporting means having a projecting annular portion within said annular recess on the other side of said bearing to support said bearing assembly adjacent said nozzle and means for injecting grease through said nozzle into said bearing assembly.

9. A grease dispensing head comprising an annular nozzle means having a bore therein, wiper means mounted within and without said nozzle means and in sliding contact with said nozzle means, a central post means secured in said nozzle bore, said central post slidingly supporting said wiper means mounted within said nozzle bore, each of said means comprising a flat outer end face, and a flat surface formed by the contiguous cooperation of the said end faces to facilitate cleaning thereof.

References Cited in the file of this patent

UNITED STATES PATENTS

| | | |
|---|---|---|
| 1,663,059 | Peterson | Mar. 20, 1928 |
| 1,953,990 | Roselund | Apr. 10, 1934 |
| 2,427,233 | Shartle | Sept. 9, 1947 |
| 2,656,012 | Thorpe | Oct. 20, 1953 |
| 2,839,160 | Wright | June 17, 1958 |